Aug. 17, 1954     E. HARPOOTHIAN ET AL     2,686,343
TUBULAR SEAL FOR PRESSURE CABINS
Filed Jan. 8, 1951
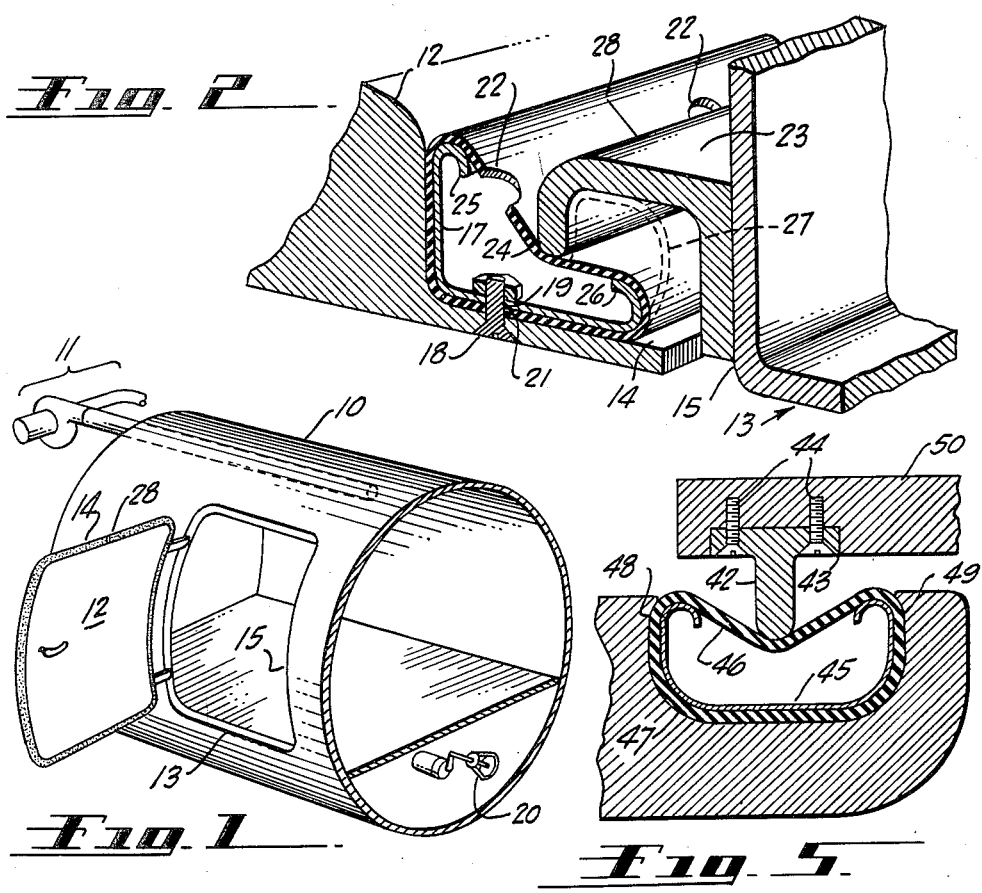
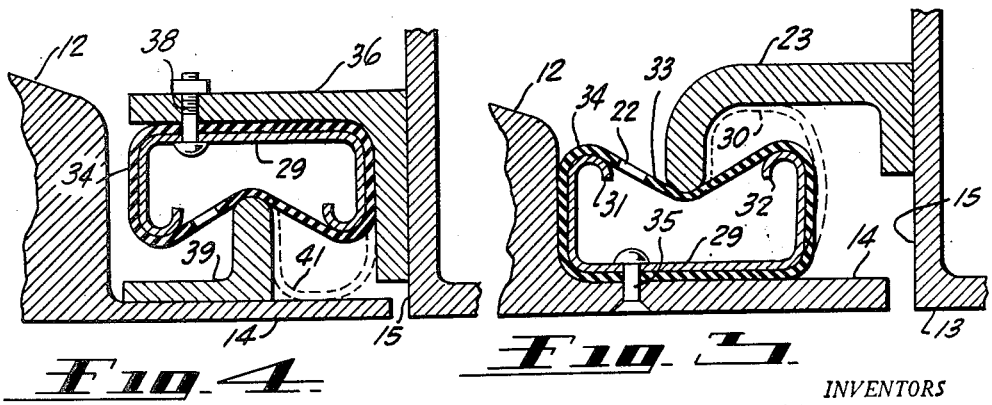
INVENTORS
EDWARD HARPOOTHIAN AND
OSCAR A. SWANSON
BY J. Edwin Coates
ATTORNEY Patented Aug. 17, 1954

2,686,343

UNITED STATES PATENT OFFICE 2,686,343

TUBULAR SEAL FOR PRESSURE CABINS

Edward Harpoothian, Los Angeles, and Oscar A. Swanson, Pacific Palisades, Calif., assignors to Douglas Aircraft Company, Inc., Santa Monica, Calif.

Application January 8, 1951, Serial No. 204,942

4 Claims. (Cl. 20—69)

The present invention relates to seals and more particularly to a novel means of sealing the mating marginal edges of such closure combinations as doors and door frames that provide access to the interior of pressurized aircraft or other types of pressurized or partially evacuated containers.

The seal of the present invention comprises in its broadest aspects a length of elastic sealing tube which surrounds an elongate channel or trough. These elements are mounted on the marginal edge of the door or door frame and are adapted to press the tube into elastic engagement with a striker mounted on the mating marginal edge of the door frame or door. Pressure inlets are provided in the tube to permit pressurized air to reach the interior of the tube, thereby forcing it to expand into sealing engagement with the striker.

The operation of aircraft at high altitudes has brought about the need for cabin and cockpit pressurization. Consequently the sealing of cockpit canopies, cargo doors, windows and other access means against internal pressures has presented numerous design problems. Previously proposed solutions have involved the use of resilient seals such as sponge rubber, rubber extrusions and the like. However the lowered resilience of these materials at the low temperatures prevailing at high altitudes adversely affects the sealing qualities of most of the prior arrangements.

Fabrication expenses have also been high since the extruded sections were complicated and required the use of rather difficult forming procedures. Previous methods also have created the problem of mounting the seal on the closure since no means of gripping or clamping the rubber has been evolved which is inexpensive by reason of simplicity. The sponge rubber or rubber extrusion must be wedged or clamped in grooves or slots since they are not rigid enough to be threaded or riveted without additional support. The same problem is present where tubular rubber extrusions are employed since previous proposals have not solved the problem of obtaining access to the interior of the tube for purposes of riveting or bolting without impairing the sealing qualities of the tubular extrusion.

The seal of the present invention obviates these difficulties by reason of a new means of supporting the sealing tube and by reason of a novel arrangement for utilizing the differential pressure to expand the tube into sealing contact with a striker. The supporting channel provides an adequate base for use in attaching the tube to the marginal edge to be sealed. The sealing tube is formed of elastic material such as natural or synthetic rubber and takes a form analogous to an inner tube when mounted around the periphery of a door or frame. No complicated extrusion is involved, the tube being readily available on the market at economical prices.

The pressure inlets provide ready access to the supporting channel and tube interior for purposes of bolting or otherwise securing the tube to the door or frame if internal attachment means are to be used. A large amount of deformation is permissible by reason of the fact that the tube need not be self-supporting and consequently can be made of relatively thin material. This permits the striker to be contacted by a larger area of the tube and thus creates a more efficient seal, particularly where large hatches or doors requiring large seal deformation are involved. The relative flexibility of the thin-walled tube also permits the use of small corner bend radii that are often required for doors and windows.

Other features and advantages of the present invention will be apparent from the following description taken in connection with the accompanying drawing in which:

Figure 1 is a fragmentary perspective schematic view showing a portion of a pressurized airplane fuselage with its pressurizing system and with a cargo door and door opening upon which are mounted the coacting parts of the seal.

Figure 2 is a fragmentary perspective view to an enlarged scale of the seal of Figure 1 in its closed or operative position.

Figure 3 is a sectional view to an enlarged scale showing another embodiment of the seal in its closed position.

Figure 4 is a sectional view to an enlarged scale showing another form of the seal in its operating position.

Figure 5 is a sectional view to an enlarged scale showing still another embodiment of the seal in its operating position.

Referring now to the drawing, Figure 1 is illustrative of one application of the seal of the present invention. In this instance a section of an airplane fuselage 10 is pressurized by means of a pressurization unit 11 of known construction in conjunction with a known type of outlet valve 20. The cargo door 12 is hinged to the door frame 13 and sealed against the internal pressure when closed by means of a seal, co-acting parts of which are mounted on the marginal edges 14 and 15 of the door and door frame.

The details of the presently preferred embodiment of the seal of Figure 1 are shown in Figure 2.

A sealing tube or elongate elastic envelope 16 elastically surrounds an angle shaped support or conduit 17 which is coextensive with the length of the sealing tube. This support may have any desired cross-sectional shape so long as it provides at least two relatively raised edges or ridges forming between them an elongate trough or gap which may be resiliently bridged by the sealing tube. Both of these parts are readily available standard materials requiring no special tooling. The tube may be made of any elastic, pressure tight, flexible material such as natural or synthetic rubber. At the present time applicant is using a general purpose weather resistant synthetic rubber tubing that is readily available on the market. The support may be made of any rigid material. However, a light 24ST aluminum alloy is preferred for use in pressurized aircraft since weight must be held to a minimum.

In the present embodiment the support and surrounding tube are mounted on the inner marginal edge 14 of the door 12 by a plurality of attachment means 18 passed through said edge and through uniformly spaced attachment openings 19 in the support which are axially aligned with adjacent attachment openings 21 in the tube. Access to the inner portion of the tube is provided by means of pressure inlets 22 which are likewise uniformly spaced and in approximate axial alignment with the aforementioned openings. The coacting sealing striker 23 is secured to the marginal edge 15 of the door frame 13 by bolting, riveting, welding or other well known means.

For most efficient operation the diameter of the cross section of the sealing tube should be such that it must be slightly stretched circumferentially in order to surround the support. A striker seat 24 is thus formed by that portion of the tube which bridges the rolled or rounded upstanding edges 25 and 26 of the channel 17.

The striker will be forced into engagement with the striker seat upon closing the door. This action further stretches the striker seat sufficiently to create a pressure tight line of contact throughout the length of the tube. In the case of a seal for the cargo door of an airplane this action occurs when no pressure differential exists between the interior and exterior of the fuselage. As the airplane rises, the ambient air pressure drops and the pressure inlets 22 automatically permit the cabin or fuselage pressure produced by the system 11 to act upon the inner wall of the tube since, at small pressure differentials, the initial deformation of the striker seat by the striker will prevent the gas from reaching the ambient air by passing the line of contact between the striker and striker seat. It is apparent that the pressure inlets must be positioned on the high pressure side of the striker in order for the seal to function. As the pressure differential increases, the tube will be expanded into more firm contact with the seal and adjacent parts as shown at 27 in dotted lines. This action greatly increases the area of pressure tight contact thereby providing a reliable seal the efficiency of which increases as the pressure differential increases.

It is clear that the coacting parts of the seal may be mounted on either the door or its frame since the principle of operation remains unchanged. Likewise, by shifting the position of the inlets to the other side of the line of contact formed by the striker and striker seat, the seal may serve to prevent the entry of gases past the marginal edges of a closure combination for a partially evacuated container. The embodiments subsequently described herein are equally adaptable for use in sealing either pressurized or partially evacuated chambers and the mounting positions for the sealing tube and striker of said embodiments are likewise interchangeable in accordance with the needs of the user.

Where it is desired that a complete loop be formed, as in Figure 1, to seal the entire periphery of a closure and its corresponding opening then the two ends of the tube may be connected by a joint 28, Figures 1 and 2, thereby forming a continuous loop with a uniform sealing surface. The jointure may be made by vulcanizing, cementing or otherwise bonding the two tube ends together. This joint may not be needed where the seal is utilized merely for its insulating qualities or to prevent the passage of gases where no perceptible pressure differential is involved. Likewise, the pressure inlets may be dispensed with in such a case unless desired in order to obtain access to the tube interior in the event internal attachment means are used.

Figure 3 depicts the seal of the present invention in another of its numerous forms. The general relation of parts and the principles of operation remain the same. However, a support conduit or channel 29 having a different cross sectional shape has been utilized. This is again a common shape requiring no special or expensive tooling. The rolled edges 31 and 32 suspend the striker seat 33 in an initial undeflected position which is parallel to the bed or bottom of the channel. It is, therefore, possible to obtain even greater seal deformation since a rectangular rather than a triangular cross-section is formed by the wall of the tube 34 prior to deformation by contact with the striker 23 upon closing the door. The channel and surrounding tube are in this instance secured to the marginal edge 14 of the door 12 by means of a plurality of rivets 35 which are in approximate axial alignment with the pressure inlets 22.

In some applications it may be desirable to crimp or fold a portion of the marginal edge 14 of the door upward into surface contact with the tube so as to form a backup flange. This prevents the air pressure from blooming out the tube in undesirable directions and maximum sealing will thus be provided.

Figure 4 depicts the seal of the present application in still another of its various forms. In this instance the support trough or channel 29 of Figure 3 and the elastic tube 34 surrounding it are mounted on a bracket 36 by a plurality of nut and bolt combinations 38. The bracket is welded or otherwise secured to the marginal edge 15 of the door frame 13. The striker 39 is secured to the marginal edge 14 of the door 12 by similar means.

The seal of Figure 4 operates in a manner fundamentally identical to the previously described embodiments. In this case the tube expands into pressure tight contact with the striker and a portion of the marginal edge of the door as shown at 41.

It is apparent that the seal of the present application, in any of its various forms, is readily adaptable to the configuration of the marginal edges of any access or closure combination. The coacting parts are readily interchangeable and may be positioned on either the closure or closure frame of any closure combination. This, of course, permits the seal to be adapted for use in various ways on closure combinations of varying configurations and composition.

The versatility of the seal is further illustrated in Figure 5 where it is shown in recessed position in a closure combination made of wood or other construction of sufficient thickness to permit such an application.

The striker 42 again may be an extruded length of metal or other sufficiently rigid material which in this instance has a T-shaped cross section. It is shown secured by a plurality of small screws 44 in a striker recess 43 formed in the door 50. The supporting trough or conduit 45 is made of thin walled material such as a metal having sufficient elasticity to permit the conduit and surrounding tube 46 to be snapped into the containing groove 47. The side walls 48 and 49 of this groove are outwardly curved or bowed in such a manner that the spring-like conduit and surrounding tube will be securely retained after being snapped into position in the groove.

This embodiment is advantageous where the seal is to be used primarily for its insulating qualities. It should be noted that it is not necessary to obtain access to the inner portions of the tube since the tube and conduit are mounted by utilizing the gripping action of the groove and the spring action of the conduit. The side walls of the groove serve as the attaching means. This method of mounting the tube is particularly suitable for use in sealing access doors or windows in a cooled container such as a refrigerated storage or shipping compartment that is not to be pressurized. In this connection it is apparent that the seal of Figure 5 may be used as a pressure seal simply by providing pressure inlets in the tube as previously described in relation to the seals shown in Figures 1 to 4.

Thorough tests of the seal both in laboratories and in use as a seal for the large cargo doors of a cargo plane have indicated that the pressure seal obtained is much more efficient than previously known seals. Moreover, sections of the seal were subjected to life cycling tests which established the fact that the present seal retains its resiliency and ability to function properly after being subjected to thousands of loading cycles over a wide range of temperatures and humidity conditions.

Because of the novel use of a thin-walled elastic tube which relies on a channel of metal or other rigid material for support, a greater degree of elasticity is obtained without any loss in rigidity and wearability. Contrary to previously known seals, it is not necessary for the elastic tube which forms the striker seat to be self supporting and self sealing. The channel supports it much more efficiently and differential pressure is additionally utilized to force the striker seat into even more effective contact with the striker, rather than attempting to obtain the sealing effect merely by deformation of the tube with high mechanical force by the striker upon closing the door. Moreover, the simplicity of construction permitting the use of standard shapes readily available on the market further enhances the novel features of the present seal. The use of inlets which serve the double function of enabling the interior of the tube to react to pressure differentials and permitting the tube and enclosed channel to be readily mounted and demounted by use of standard types of rivets, screws, and the like is an important advance over the prior art.

Although the now preferred embodiments of the present invention have been illustrated and described, it is to be understood that the invention need not be limited thereto for it is susceptible to changes in form, detail and application within the scope of the appended claims.

We claim:

1. A gas-pressure seal for the marginal edges of a pressure-tight closure combination, comprising: elongate, trough-shaped support means having rounded, free edges; elastic tubular sealing means peripherally surrounding said support means and having a diameter such that its engagement with said support means places it under tension; fastener means constituting the sole attaching means for said support means and sealing means passing through the base of said support means and the adjacent portion of said sealing means to attach both of said means securely to one of the marginal edges of said closure combination; a portion of the periphery of said tubular means extending between the rounded free edges of said support means free of attachment adjacent said edges and being engaged therewith solely by tension-engendered friction so as to enable the edges of said support member to define with said tubular means an elastic movable-edge bridge extending between said free edges, said bridge constituting a striker seat and seal; and pressure inlet means formed in said striker seat.

2. A device as claimed in claim 1 in which said support means is generally rectangular in cross section.

3. A device as claimed in claim 1 in which said support means is generally triangular in cross section.

4. A gas-pressure seal for the marginal edges of a pressure-tight closure combination, comprising: elongate trough-shaped support means having rounded, free edges; elastic tubular sealing means peripherally surrounding said support means and having a diameter such that it snugly engages said support means; fastener means constituting the sole attaching means for said support means and sealing means passing through the base of said support means and the adjacent portion of said sealing means to attach both of said means securely to one of the marginal edges of said closure combination; the portion of said sealing means in the fastening area serving as a seal against leakage past said fastener means; a portion of the periphery of said tubular means extending between the rounded free edges of said support means free of attachment adjacent said edges and being slidably engaged therewith to enable said edges to define with said tubular means an elastic movable-edge bridge extending between said free edges, said bridge constituting a striker seat and seal; and openings formed in said striker seat opposite to and in general alignment with said fastener means to afford access thereto, said openings additionally serving as pressure inlet means to the interior of said tubular means.

References Cited in the file of this patent

UNITED STATES PATENTS

| Number | Name | Date |
| --- | --- | --- |
| 1,979,636 | Olander | Nov. 6, 1934 |
| 2,560,665 | Stark | July 17, 1951 |

FOREIGN PATENTS

| Number | Country | Date |
| --- | --- | --- |
| 602,715 | Great Britain | June 1, 1948 |